United States Patent [19]

Wu

[11] Patent Number: 4,942,612
[45] Date of Patent: Jul. 17, 1990

[54] LEAKAGE CURRENT PREVENTING MEANS FOR A DRIER

[76] Inventor: Huck Wu, No. 46, Ho Hu, Lin Kou, Taipei, Taiwan

[21] Appl. No.: 138,978

[22] Filed: Dec. 29, 1987

[51] Int. Cl.$^5$ .............................................. H02H 3/16
[52] U.S. Cl. ....................................... 361/49; 361/50; 361/42
[58] Field of Search ...................... 361/42, 43, 44, 45, 361/46, 47, 48, 49, 50; 307/116, 118, 131, 132 E, 132 EA

[56] References Cited

U.S. PATENT DOCUMENTS

| | | | |
|---|---|---|---|
| 3,864,581 | 2/1975 | Satyanarayana | 361/49 |
| 4,031,431 | 6/1977 | Gross | 361/42 |
| 4,464,582 | 8/1984 | Aragaki | 307/118 |
| 4,550,358 | 10/1985 | Crowley et al. | 361/42 |
| 4,589,047 | 5/1986 | Gaüs et al. | 361/42 |
| 4,706,153 | 11/1987 | Sainomoto | 361/50 X |
| 4,734,822 | 3/1988 | Gilardoni | 361/42 |
| 4,751,603 | 6/1988 | Kwan | 361/42 |

FOREIGN PATENT DOCUMENTS 553707  4/1977  U.S.S.R. ................................. 361/42

Primary Examiner—A. D. Pellinen
Assistant Examiner—H. L. Williams
Attorney, Agent, or Firm—Varndell Legal Group

[57] ABSTRACT

A leakage current preventing means for a drier includes a power circuit connected to an AC source, a touch control circuit connected to the power circuit and having a touch control IC and a touch control terminal capable of actuating the touch control IC, an output circuit connected to the touch control circuit and having a control medium which can be triggered into conduction by a pulse output from the IC and controls two junctions of the fire and ground wires from the AC source for being power supplied, and a leakage current detecting circuit connected to the touch control circuit and including a sensor for detecting an impedance change in the drier and an actuating medium capable of being energized into conduction in response to the impedance change to enable that the IC has no voltage output which results in non-conduction of the control medium which in turn results in no possible leakage current between the two junctions.

6 Claims, 4 Drawing Sheets

4,942,612

LEAKAGE CURRENT PREVENTING MEANS FOR A DRIER

BACKGROUND OF THE INVENTION

The present invention relates to a leakage current preventing means and, more particularly, to a leakage current preventing means for a drier.

In the known drier, the AC source is controlled by a power switch and several rectifiers and the drier itself is not provided with any leakage current protecting means to avoid a possible damage resulting therewith. In order to overcome this imperfection, use of one AC silicon controlled rectifier (TRIAC) in the drier has been attempted for controlling the AC power source, this being a so called AC phase-shift control which controls the voltage supplied to the load (the heater) with the triggering angle of the TRIAC. Since such control merely is designed to control the fire wire of two conductors power-supplied by the AC source, leakage current still is possible because of the uncontrolled ground wire of the two conductors even when the TRIAC is not in conduction. This situation will be more apparent when the drier is dropped into the water, causing a short-circuit phenomenon.

It is therefore attempted by the applicant to devise a leakage current preventing means for a drier to ensure that the drier has no leakage current in any possible case.

SUMMARY OF THE INVENTION

It is therefore an object of the present invention to provide a drier having a leakage current in no case.

According to the present invention, a leakage current preventing means for a drier includes a power circuit connected to an AC source, a touch control circuit connected to the power circuit and having a touch control IC and a touch control terminal capable of actuating the IC, an output circuit connected to the touch control circuit and having a control medium which can be triggered to be in conduction by a pulse output from the IC and controls two junctions connected to a fire wire and a ground wire from the AC source for being power-supplied, and a leakage current detecting circuit connected to the touch control circuit and including a sensor for detecting an impedance change in the drier and an actuating medium capable of being energized into conduction in response to the impedance change to enable that the IC has no voltage output which results in non-conduction of the control medium which in turn results in no possible leakage current between the two junctions.

Each circuit in the predecing paragraph can be sealed in, e.g., silicon rubber or epoxy resin and then disposed in the drier in a manner that only the touch control terminal and the sensor appear on the body of the drier and the two junctions can be connected to the fire wire and the ground wire of two conductors to be power-supplied by the AC source.

The present invention may best be understood through the following description with reference to the accompanying drawings, in which:

DETAILED DESCRIPTION OF THE PREFERRED EMBODIMENT

Figure 1:
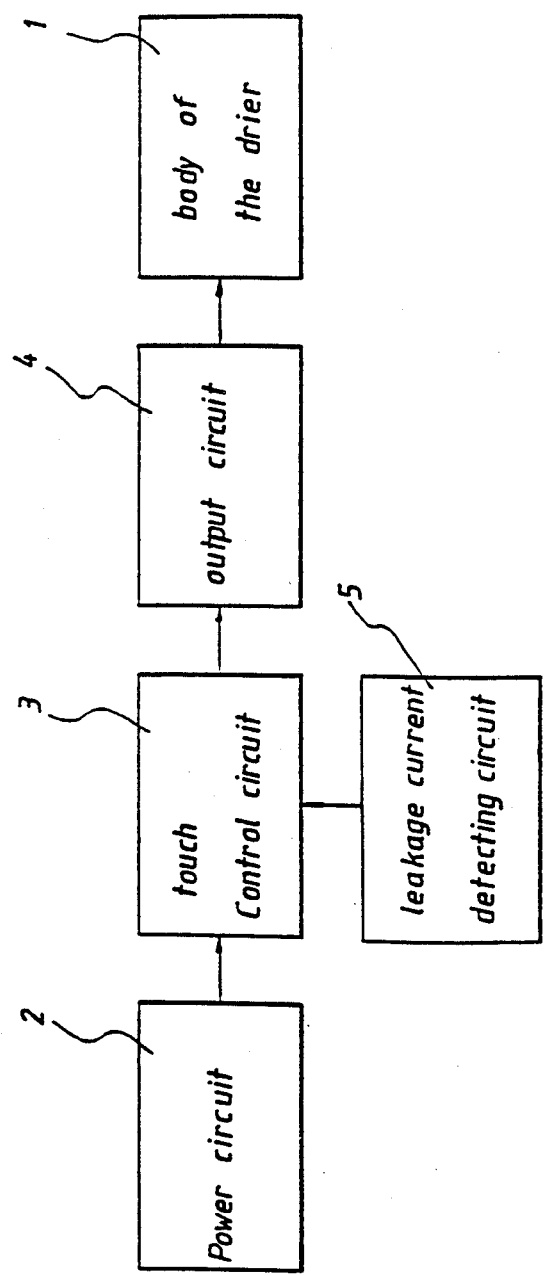
FIG. 1 is a block diagram showing a preferred embodiment of a leakage current preventing means for a drier according to the present invention.
Figure 2:
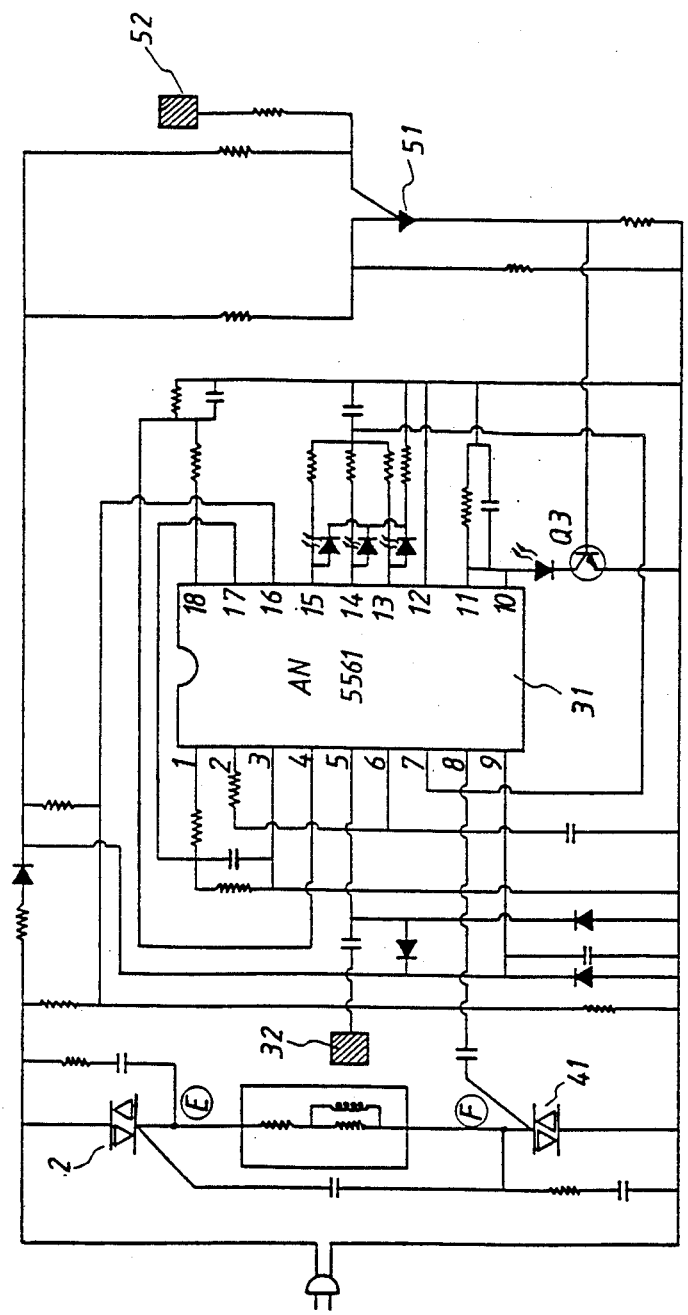
FIG. 2 is a circuit diagram showing a leakage current preventing means for a drier in FIG. 1 according to the present invention.

Referring now to FIGS. 1 & 2, there is shown a leakage current preventing means for a drier according to the present invention which includes a power circuit 2, a touch control circuit 3 electrically connected to power circuit 2, an output circuit 4 electrically connected to touch control circuit 3 and the body 1 of the drier, and a leakage current detecting circuit 5 electrically connected to touch control circuit 3.

Power circuit 2 is electrically connected to an AC power source. Touch control circuit has a touch control IC 31, e.g. 5561 (manufactured by Syntec Design Technology, Ltd., 3 Science Fifth Rd., 3, Science-based Industrial Park Hsinchu, Taiwan, R.O.C., Tel: (035) 773180, Fax: (035) 779475) and a touch control terminal 32 capable of actuating touch control IC 31. Terminal 32 can be disposed on body 1 at a place easy for operation. Every input of the touch signal from terminal 32 can actuate IC 31 to light up a respective LED showing the operation state.

Output circuit 4 includes a control medium which can be triggered into conduction by a pulse output from IC 31 and controls the fire wire and the ground wire of two conductors from the AC source. The control medium includes two TRIACs 41, 42 for respectively controlling the fire wire and the ground wire from the AC source so that when two TRIACs 41, 42 are not in operation, the two junctions E, F between first anodes of two TRIACs 41, 42 have no leakage current therebetween in any case. To this end, respective circuit connections are isolated by capacitors.

Leakage current detecting circuit 5 includes a sensor 52 for detecting an impedance change in body 1 and an actuating medium 51 capable of being energized into conduction in response to the impedance change to enable that IC 31 has no voltage output which results in non-conduction of the control medium which in turn results in no possible leakage current between two junctions E, F. Actuating medium 51 can be a process unijunction transistor (PUT) having its gate electrode connected to sensor 52 which can be disposed in a suitable position on body 1. The cathode of the PUT is connected to pins 10, 11 of IC 31 for controlling the voltage state of the pins.

Under normal operation of drier body 1, touch control terminal 32 is touched to actuate IC 31 which outputs pulses from pin 8 thereof to continuously trigger the gate electrodes of two TRIACs 41, 42 and put them in conduction. Thus, the voltage supplied to the heater can be controlled in multi-step manner. The voltage in each step can be denoted by the provided respective LED.

If one, e.g., inadvertently drops body 1 into the water, sensor 52 will detect an impedance change which conducts PUT 51 which in turn sets pin 10, 11 of IC 31 at a low voltage to be in a RESET state which ensures that IC 31 has no output voltage to actuate two TRIACs 41, 42 which further ensures that two junctions E, F on body 1 controlled by two TRIACs 41, 42 respectively will have no leakage current therebetween in any circumstance since the power source is switched off now. It is therefore that the safety of the drier is greatly improved.

Since PUT 51 will be in self-retaining state after its conduction, the power source plug needs to be disengaged from the source socket and then re-inserted into the socket if the drier is to be used further. Thus, a further protection for the user is obtained.

Each circuit above described can be sealed in, e.g., a silicon rubber or an epoxy resin and then disposed in body 1 and it can be left apparent only touch control terminal 32 and sensor 52 on body 1 and left two junctions capable of being connected to wires from the power source. Thus, each circuit can be water-proof and can prevent a leakage current.

Figure 3:
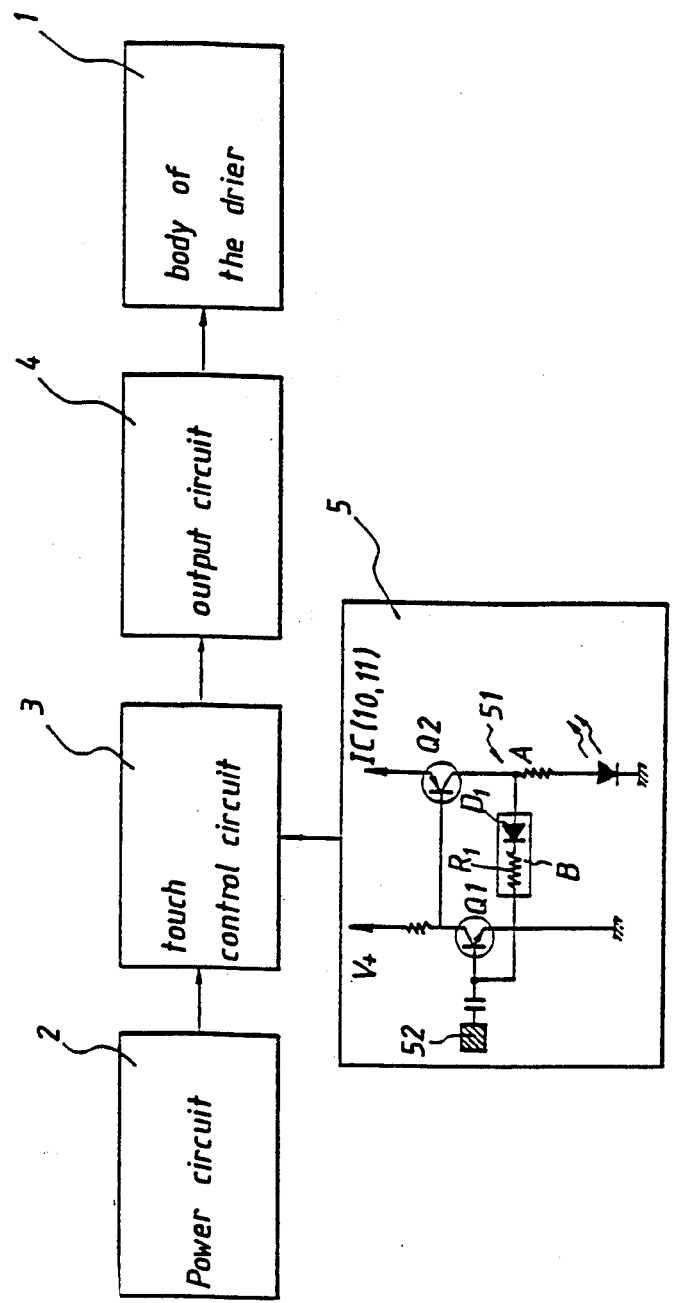
FIG. 3 is a circuit diagram showing a second preferred embodiment of a leakage current detecting circuit of a leakage current preventing means for a drier according to the present invention.

Referring to FIG. 3, there is shown a second preferred embodiment of a leakage current detecting circuit 5 in which actuating medium 51 includes an NPN transistor Q1, a PNP transistor Q2 and a feedback circuit B consisting of a diode D1 and a resistor R1. When sensor 52 detects an impedance change, point A in the circuit 5 will change from a grounded low voltage state to a high voltage state, and transistor Q1 is conducted through feedback circuit B and will be in a self-retaining situation. Then, transistor Q2 will be triggered into conduction which puts pin 10, 11 of IC 31 in the RESET state, pins 10, 11 being connected to the emitter of transistor Q2.

Figure 4:
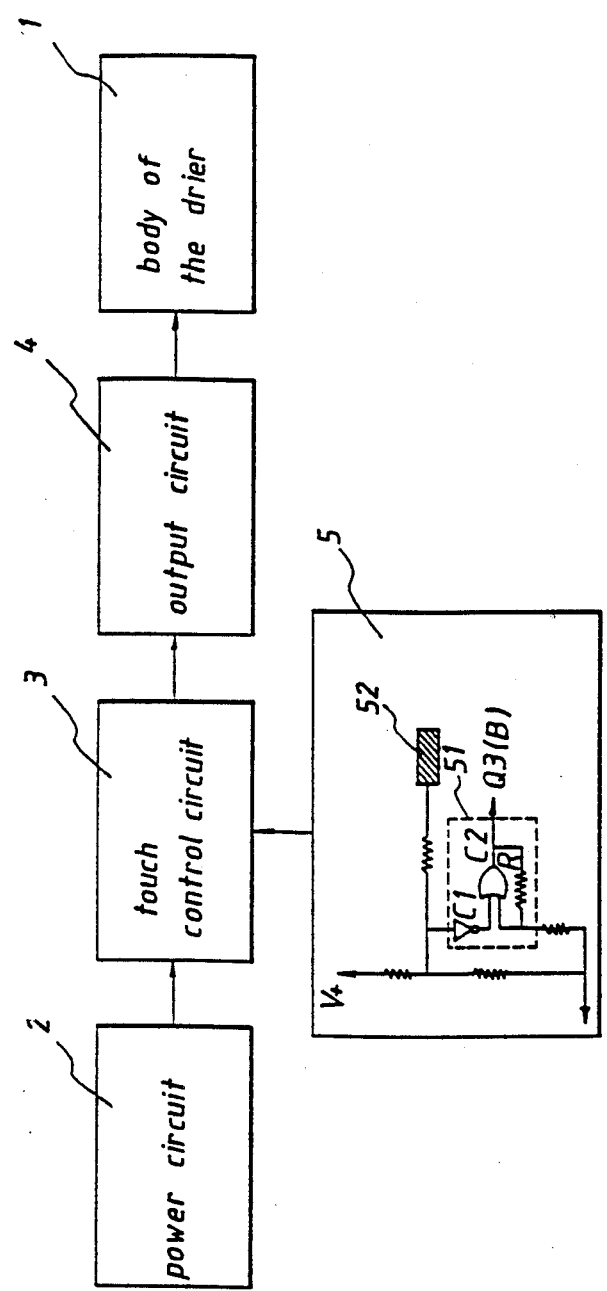
FIG. 4 is a circuit diagram showing a third preferred embodiment of a leakage current detecting circuit of a leakage current preventing means for a drier according to the present invention.

Referring now to FIG. 4, there is shown a third preferred embodiment of leakage current detecting circuit 5 in which actuating medium 51 includes a NOT gate C1, an OR gate C2 and a feedback resistor R. When sensor 52 detects an impedance change, OR gate C2 changes from a high voltage state into a low voltage state which in turn puts pins 10, 11 of IC 31 in a RESET state. The output of OR gate C2 can be connected to the base electrode of a transistor Q3 shown in FIG. 2.

While the present invention has been described in connection with what is presently considered to be the most practical and preferred embodiment, it is to be understood that the invention is not to be limited to the disclosed embodiment but on the contrary, is intended to cover varrious modifications and equivalent arrangements included within the spirit and scope of the appended claims which scope is to be accorded the broadest interpretation so as to encompass all such modifications and equivalent structures.

What I claim is:

1. A drier having a leakage current preventing system comprising:
   a power source means for providing a voltage from an AC source and including hot and ground wires,
   an output circuit means for supplying said voltage to said dryer and including two TRIACs for permitting said voltage to pass to said output circuit means in response to a pulsed signal, one TRIAC being electrically connected to said hot wire and another TRIAC being electrically connected to said ground wire,
   a touch control means for controlling said pulsed signal and including a touch control IC for providing said pulsed signal to said TRIACs in response to an actuating signal and a touch control terminal for providing said actuating signal to said touch IC; said TRIACs, touch control terminal and touch control IC being arranged so that when a user of the dryer touches said touch control terminal, said input signal is sent to said touch control IC and in response thereto said touch control IC provides said pulsed signal to said TRIACs, and
   a leakage circuit detecting circuit means including a sensor means for detecting an impedance change in said dryer and actuation means for resetting said touch control IC in response to a detected impedance change by said sensor including an uni-junction transistor (PUT) arranged to receive said detected impedance change from said sensor and to provide said reset signal to said touch control IC, thereby ending said pulsed signal to said TRIACs and preventing supply of voltage to said output circuit and between said TRIACs.

2. The drier having a leakage current preventing system of claim 1, wherein said touch control means is capable of multi-step control of said voltage supplied to said dryer by continuously providing said pulsed signal to said TRIACs by said touch control IC in response to touching of said touch control terminal by said user.

3. A drier having a leakage current preventing system comprising:
   a power source means for providing a voltage from an AC source and including hot and ground wires,
   an output circuit means for supplying said voltage to said dryer and including two TRIACs for permitting said voltage to pass to said output circuit means in response to a pulsed signal, one TRIAC being electrically connected to said hot wire and another TRIAC being electrically connected to said ground wire,
   a touch control means for controlling said pulsed signal and including a touch control IC for providing said pulsed signal to said TRIACs in response to an actuating signal and a touch control terminal for providing said actuating signal to said touch IC; said TRIACs, touch control terminal and touch control IC being arranged so that when a user of the dryer touches said touch control terminal, said input signal is sent to said touch control IC and in response thereto said touch control IC provides said pulsed signal to said TRIACs, and
   a leakage circuit detecting circuit means including a sensor means for detecting an impedance change in said dryer and actuation means for resetting said touch control IC in response to a detected impedance change by said sensor including an NPN transistor, a PNP transistor and a feedback circuit having a diode and a resistor arranged to receive said detected impedance change from said sensor and to provide said reset signal to said touch control IC, thereby ending said pulsed signal to said TRIACs and preventing supply of voltage to said output circuit and between said TRIACs.

4. The drier having a leakage current preventing system of claim 3, wherein said touch control means is capable of multi-step control of said voltage supplied to said dryer by continuously providing said pulsed signal to said TRIACs by said touch control IC in response to touching of said touch control terminal by said user.

5. A drier having a leakage current preventing system comprising:
   a power source means for providing a voltage from an AC source and including hot and ground wires, an output circuit means for supplying said voltage to said dryer and including two TRIACs for permitting said voltage to pass to said output circuit means in response to a pulsed signal, one TRIAC being electrically connected to said hot wire and another TRIAC being electrically connected to said ground wire, a touch control means for controlling said pulsed signal and including a touch control IC for providing said pulsed signal to said TRIACs in response to an actuating signal and a touch control terminal for providing said actuating signal to said touch IC; said TRIACs, touch control terminal and touch control IC being arranged so that when a user of the dryer touches said touch control terminal, said input signal is sent to said touch control IC and in response thereto said touch control IC provides said pulsed signal to said TRIACs, and a leakage circuit detecting circuit means including a sensor means for detecting an impedance change in said dryer and actuation means for resetting said touch control IC in response to a detected impedance change by said sensor including a NOT gate, an OR gate and a feedback resistor arranged to receive said detected impedance change from said sensor and to provide said reset signal to said touch control IC, thereby ending said pulsed signal to said TRIACs and preventing supply of voltage to said output circuit and between said TRIACs.

6. The drier having a leakage current preventing system of claim 5, wherein said touch control means is capable of multi-step control of said voltage supplied to said dryer by continuously providing said pulsed signal to said TRIACs by said touch control IC in response to touching of said touch control terminal by said user.

* * * * *